(12) United States Patent
Watanabe

(10) Patent No.: US 8,640,456 B2
(45) Date of Patent: Feb. 4, 2014

(54) CHARGE AIR COOLER ASSEMBLY

(75) Inventor: Atsuhiko Watanabe, Columbus, IN (US)

(73) Assignee: Cummins Intellectual Property, Inc., Minneapolis, MN (US)

( * ) Notice: Subject to any disclaimer, the term of this patent is extended or adjusted under 35 U.S.C. 154(b) by 69 days.

(21) Appl. No.: 13/308,373

(22) Filed: Nov. 30, 2011

(65) Prior Publication Data

US 2013/0133630 A1    May 30, 2013

(51) Int. Cl.
*F02B 29/04* (2006.01)
*F02B 33/00* (2006.01)

(52) U.S. Cl.
USPC ............................................ 60/599; 123/563

(58) Field of Classification Search
USPC ...................... 60/605.1, 611, 599; 123/563
IPC ...................................................... F02B 29/04
See application file for complete search history.

(56) References Cited

U.S. PATENT DOCUMENTS

| | | | |
|---|---|---|---|
| 4,893,591 A | 1/1990 | Nelson | |
| 5,375,565 A | 12/1994 | Maxson et al. | |
| 5,709,187 A | 1/1998 | Jaeger et al. | |
| 6,550,461 B2 | 4/2003 | Robitschko | |
| 6,990,814 B2 * | 1/2006 | Boley et al. | 60/611 |
| 7,077,113 B2 | 7/2006 | Bilek et al. | |
| 7,165,403 B2 * | 1/2007 | Sun et al. | 60/612 |
| 2009/0014161 A1 * | 1/2009 | Mihajlovic | 165/148 |
| 2010/0242937 A1 * | 9/2010 | Baldauf et al. | 123/704 |
| 2011/0155112 A1 * | 6/2011 | Schiestl et al. | 123/672 |
| 2012/0017877 A1 * | 1/2012 | Laube et al. | 123/542 |

FOREIGN PATENT DOCUMENTS

| | | | | |
|---|---|---|---|---|
| DE | 2059220 A1 | * | 12/1970 | F02B 29/04 |
| JP | 60088821 A | * | 5/1985 | F02B 29/04 |

OTHER PUBLICATIONS

Machine translation obtained from espacenet.org of DE2059220A1 (or equivalent FR2117158A5 published in Nov. 1971) published in Dec. 1970 (see translation of equivalent is attached).*
English abstract of JP 60088821 A published in May 1985 (attached to Japanese patent publication).*

* cited by examiner

*Primary Examiner* — Thomas Denion
*Assistant Examiner* — Ngoc T Nguyen
(74) *Attorney, Agent, or Firm* — Faegre Baker Daniels LLP

(57) ABSTRACT

A charge air cooler assembly for an internal combustion engine is described. A housing of the charge air cooler assembly includes a dividing wall that separates flow after the charge air cooler into two separate flow paths.

7 Claims, 4 Drawing Sheets

CHARGE AIR COOLER ASSEMBLY

TECHNICAL FIELD

This disclosure relates to charge air coolers for internal combustion engines.

BACKGROUND

High speed, which may be 1200 to 1800 rpm, natural gas engines in industrial applications such as gas compression and power generation producing 500 kW to several megawatts of shaft power are typically turbocharged and intercooled and often employ twelve or more cylinders arranged in a "V" configuration. This configuration results in a large volume of combustion gases in the intake system, especially on engines where the intake manifold is on the outboard side of the "V." Gaseous fuel may be introduced into the air stream at the inlet of the compressor, resulting in a highly combustible air-fuel mixture throughout the entire intake system. This mixture has the potential to ignite in the intake system upon encountering an ignition source such as a combustion gas from an improperly seated intake valve. Once the air-fuel mixture ignites, the flame will travel extremely rapidly toward the charge air cooler, crossing over into the opposite intake manifold, thus igniting a substantial volume of fuel and leading to an intake manifold overpressure event, which may be called a backfire, that significantly exceeds typical operating pressures.

A variety of countermeasures have been employed in these engines to withstand potential overpressure, including building the intake manifold with sufficient thickness and material to withstand to accommodate potential overpressure. A flame arrestor may also be part of such engines to quench flames.

Other techniques have been used in an attempt to eliminate or reduce overpressure events. For example, the use of timed port injection of fuel, with a solenoid at the intake port of every cylinder a short distance upstream of the intake valves. Fuel injection takes place only when the exhaust valves are closed and the intake valves are open. This technique significantly reduces the volume of the air-fuel mixture in the intake manifold, which reduces the likelihood of intake manifold overpressure. While this configuration is often used on medium speed gas engines, this configuration adds significant cost and complexity and is seldom used on high-speed gas engines. Furthermore, such events can still occur, such as when an injector malfunction results in a continuous stream of fuel.

Another technique to reduce intake manifold overpressure is to reverse the location of the intake and exhaust manifolds, so that the intake manifold is inside the "V"-bank and the exhaust manifold is on the outboard side. This configuration significantly reduces the volume and length of the intake manifold, thus minimizing intake manifold overpressure intensity from combustion of the air-fuel mixture. While some engines are capable of using this configuration, other engine configurations do not permit reversing the location of the intake and exhaust manifolds without significant redesign of the engines, potentially compromising operational characteristics and leading to substantial cost burden.

An array of pressure relief valve or burst disks may also be located in strategic locations around the intake manifold. However, in addition to added cost, pressure relief valves may not reseal and burst disks need replacement after an intake manifold overpressure event. Such devices have also been inconsistent in actual operation with variations in actuating pressure, potentially still permitting excessive intake manifold overpressure events.

Some engines may incorporate a combination of such elements. Regardless of the countermeasures incorporated, the possibility of an intake manifold overpressure event is always present in natural gas engines, especially on engines where fuel is introduced significantly upstream of a cylinder's intake ports.

Thus, there is a need to reduce the severity of fuel ignition events should they occur and limiting the extent of such events.

SUMMARY

This disclosure provides a charge air cooler assembly for an internal combustion engine. The charge air cooler assembly comprises a charge air cooling section having an upstream side and a downstream side, a first housing section extending from the upstream side of the charge air cooling section, the first housing section including a housing inlet, a second housing section extending from the downstream side of the charge air cooling section, the second housing section including a first outlet and a second outlet, and a dividing wall positioned in the second housing section and extending from the charge air cooling section to a portion of the second housing section between the first outlet and the second outlet. The dividing wall creates a first fluid flow path from the charge air cooling section to the first outlet and a second fluid flow path from the charge air cooling section to the second outlet, the first fluid flow path being fluidly separated from the second fluid flow by the dividing wall.

This disclosure also provides a fueling system for a gaseous fuel powered internal combustion engine comprising an air inlet for providing air to the internal combustion engine, a gaseous fuel supply, a gas mixer for receiving air from the air inlet and gaseous fuel from the gaseous fuel supply, and a charge air cooler assembly downstream of the gas mixer and connected to the gas mixer by an inlet flow tube. The charge air cooler assembly includes a charge air cooling section, a first housing section extending from a first side of the charge air cooling section, the first housing section including a housing inlet, a second housing section attached to the second side of the charge air cooling section, the second housing section including a first outlet and a second outlet, and a wall positioned in the second housing section and extending from the charge air cooling section to a portion of the second housing section between the first outlet and the second outlet. The wall creates a first fluid flow path from the charge air cooling section to the first outlet and a second fluid flow path from the charge air cooling section to the second outlet. The first fluid flow path is fluidly separated from the second fluid flow path by the wall. The fueling system also includes a first intake manifold connected to the first outlet downstream of the first outlet and a second intake manifold connected to the second outlet downstream of the second outlet.

This disclosure also provides a fueling system for a gaseous fuel power internal combustion engine comprising an air inlet and a charge cooler assembly downstream of the air inlet and connected to the air inlet by an inlet flow tube. The charge air cooler assembly includes a charge air cooler device, a first housing attached to the first side of the charge air cooler device, the first housing including a housing inlet, a second housing attached to the second side of the charge air cooler device, the second housing including a first outlet opening and a second outlet opening, and a wall positioned in the second housing and extending from the charge air cooler device to a portion of the second housing between the first outlet opening and the second outlet opening. The wall creates a first fluid flow path from the charge air cooler device to the first outlet opening and a second fluid flow path from the charge air cooler device to the second outlet opening. The first fluid flow path is fluidly separated from the second fluid flow path by the wall. The fueling system also includes a first gas mixer receiving gaseous fuel from a gaseous fuel source, connected to the first outlet opening downstream of the first outlet opening and having a first source output. The fueling system also includes a first intake manifold located downstream of the first source output. The fueling system also includes a second gas mixer receiving gaseous fuel from a gaseous fuel source, connected to the second outlet opening downstream of the second outlet opening and having a first source output. The fueling system also includes a second intake manifold located downstream of the second source output.

Advantages and features of the embodiments of this disclosure will become more apparent from the following detailed description of exemplary embodiments when viewed in conjunction with the accompanying drawings.

DETAILED DESCRIPTION

Figure 1:
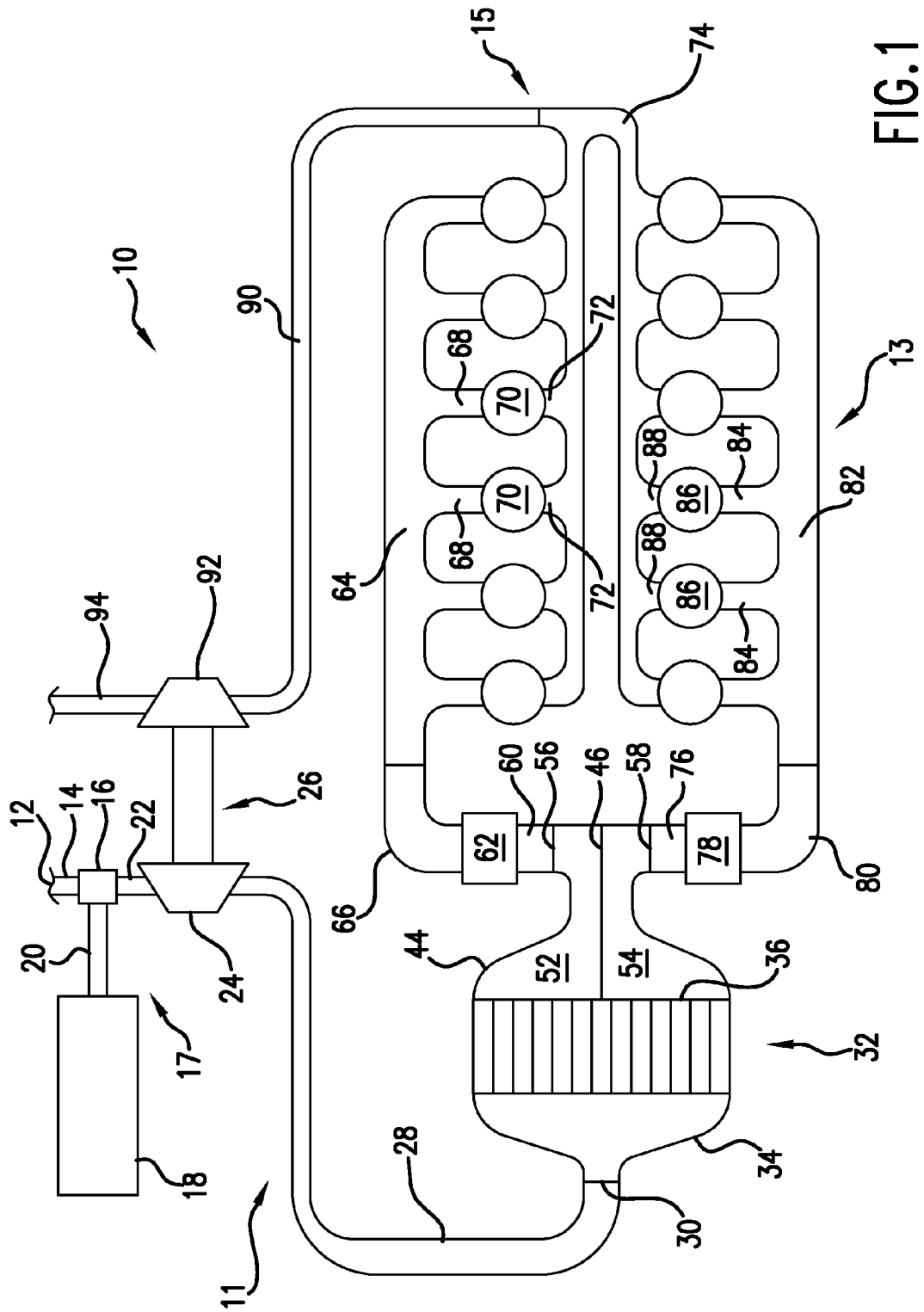
FIG. 1 is a schematic of an internal combustion engine in accordance with an exemplary embodiment of the present disclosure.

Turning now to the figures, illustrated in FIG. 1 is a first exemplary embodiment of an internal combustion engine 10 in accordance with the present disclosure. Engine 10 includes an intake system 11, an engine body 13, an exhaust system 15 and a fueling system 17. Fueling system 17 is connected to intake system 11 and may share components with intake system 11. Intake system 11 and fueling system 17 are connected to engine body 13, upstream of engine body 13. Exhaust system 15 is then connected to engine body 13 on the downstream side of engine body 13.

Intake system 11 has an air inlet 12, which may have other elements associated with it, such as a filter (not shown). A first conduit 14 connects air inlet 12 to a gas mixer 16. It will be understood that the conduits described herein may be ducts, tubes, pipes and other mechanisms suitable for the purposes described herein. Fueling system 17 includes a natural gas source 18, which may be a pressurized tank, a line from a storage tank, or other method of supplying natural gas, which connects to gas mixer 16 via a source connection 20. Note that "natural gas" may be methane. In the context of this disclosure, "natural gas" may also refer to other combustible gases such as propane and hydrogen, thus another term for "natural gas" in the context of this disclosure may be "gaseous fuel." Furthermore, the present disclosure may also benefit dual-fuel or bi-fuel engines, which may be converted from an existing diesel engine by fumigating natural gas at the compressor inlet, intake manifold, or other locations. The substitution of combustible gases for diesel is often in the range of 50% to 80%.

A second conduit 22 connects gas mixer 16 to a compressor 24 of a turbocharger 26. The outlet of compressor 24 is connected to a housing inlet 30 of a charge air cooler assembly 32 by a compressor outlet tube or inlet flow conduit 28. Charge air cooler assembly 32 has a first outlet 56 and a second outlet 58 for connection of charge air cooler assembly 32 to engine body 13.

A third conduit 60, which may be part of engine body 13, connects first outlet 56 to an optional first throttle 62. First throttle 62 may connect directly to a first intake manifold 64 or a fourth conduit 66 of engine body 13. If first throttle 62 connects to fourth conduit 66, then fourth conduit 66 may connect to first intake manifold 64. Note that if optional first throttle 62 is not used, first intake manifold 64 may be connected directly to first outlet 56 or a conduit appropriately configured to connect first intake manifold 64 to first outlet 56. First intake manifold 64 includes a plurality of first bank intake ports 68. First bank intake ports 68 provide a connection between intake manifold 64 and a plurality of first bank cylinders 70. First bank cylinders 70 connect to a plurality of first bank exhaust ports 72, which are part of an exhaust manifold 74. Both first bank exhaust ports 72 and exhaust manifold 74 are part of exhaust system 15.

In a similar manner to the description above, a fifth conduit 76 connects second outlet 58 to an optional second throttle 78. A sixth conduit 80 then connects second throttle 78 to a second intake manifold 82. Second intake manifold 82 includes a plurality of second bank intake ports 84, which provide a connection between intake manifold 82 and a plurality of second bank cylinders 86. Second bank cylinders 86 are connected to a plurality of second bank exhaust ports 88, which are part of exhaust manifold 74. Second bank exhaust ports 88 and exhaust manifold 74 are part of exhaust system 15.

Exhaust manifold 74 may be connected directly to a turbine 92 that drives turbocharger 26 or exhaust manifold 74 may be connected to an exhaust conduit 90 that connects exhaust manifold 74 to turbine 92. A turbine exhaust conduit 94 connects turbine 92 to one or more locations, which may include an aftertreatment system (not shown) or an exhaust gas recirculation system (not shown).

Figure 2A:
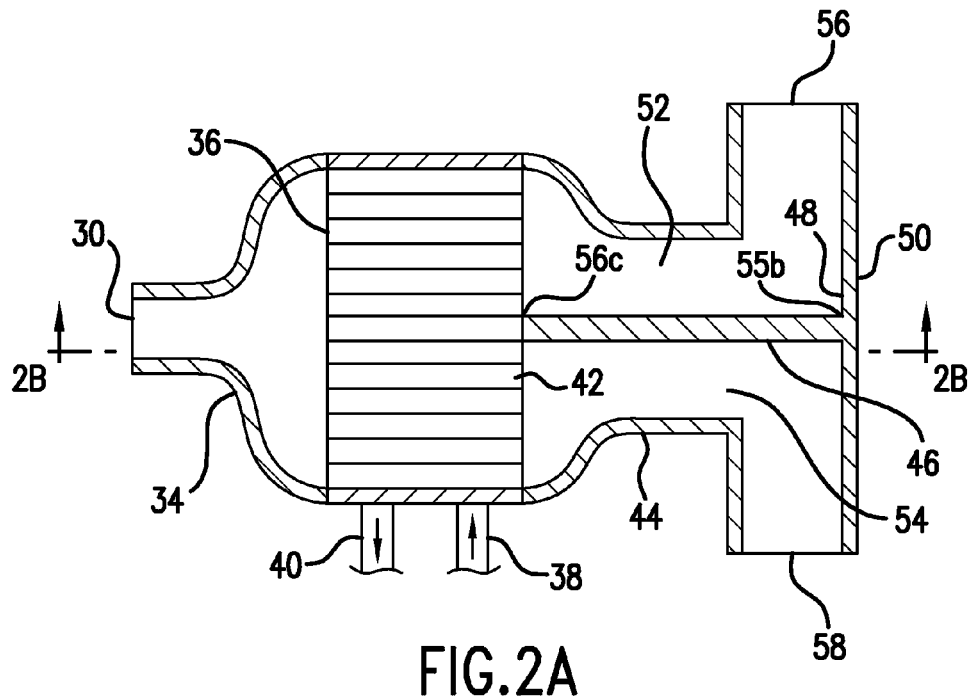
FIG. 2A is a partial section of the charge air cooler assembly of FIG. 1.
Figure 2B:
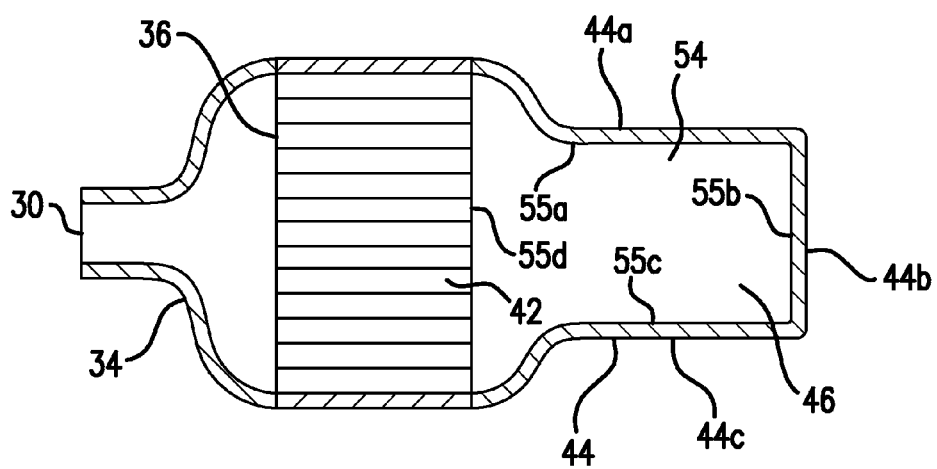
FIG. 2B is a partial section of the charge air cooler assembly of FIG. 1 along the line 2B-2B in FIG. 2A as if the partial section shown in FIG. 2A were a complete charge air cooler assembly.

Charge air cooler assembly 32, shown in more detail in FIGS. 2A and 2B, includes a first housing section 34, a charge air cooling section, charge air cooler section or charge air cooling device 36, and a second housing section 34. First housing section 34 connects to and extends upstream from charge air cooling section 36. First housing section 34 may be abutted to charge air cooling section 36 or may partially or completely enclose charge air cooling section 36. First housing section 34 may be welded or otherwise attached to charge air cooling section 36 or may enclose charge air cooling section 36 with appropriate insulation between charge air cooling section 36 and first housing section 34 to prevent the leakage of fuel and air.

Attached to and extending from the second, or downstream, side of charge air cooling section 36 is a second housing section 44. Similar to first housing section 34, second housing section 44 may be abutted to charge air cooling section 36 or may partially or completely enclose charge air cooling section 36. The value to this flexibility is that a charge air cooling section may be reconfigured with a second housing section 44 as an aftermarket or field retrofit by permitting a charge air cooling section to be configured with a second housing section 44 in the field. Second housing section 44 may be welded or otherwise attached to charge air cooling section 36 or may enclose charge air cooling section 36 with appropriate insulation between charge air cooling section 36 and second housing section 44 to prevent the leakage of fuel and air.

Second housing section 44 provides a passage from charge air cooling section 36 to a pair of outlets. In existing charge air cooler assemblies, a single passage extends from the charge air cooling section to the two outlets. In the present disclosure, second housing section 44 includes a dividing wall 46. Dividing wall 46 extends from charge air cooling section 36 to an interior portion 48 of second housing section 44. Interior portion 48 may be a distal portion 50 or may be another suitable interior portion of second housing 44. Dividing wall 46 may be an integral part of second housing section 44 or it may be a second piece secured or attached to second housing section 44. Dividing wall 46 may also be secured between charge air cooling section 36 and second housing section 44.

Referring to FIG. 2B, dividing wall 46 is sealingly secured about its periphery to second housing section 44 and to charge air cooling section 36. Thus, dividing wall 46 is sealingly secured to an upper portion 44a of second housing section 44 at location 55a, an end portion 44b of second housing section 44 at location 55b, a lower portion 44c of section housing section 44 at location 55c, and a downstream side of charge air cooling section 36 at location 55d. Upper portion 44a, end portion 44b and lower portion 44c may be curvilinear, flat or planar, or a combination of shapes.

The attachment of dividing wall 46 to second housing section 44 and the abutment of dividing wall 46 against charge air cooling section 36 divides second housing section 44 into a first fluid flow path 52 and a second fluid flow path 54. Dividing wall 46 may be an absolute seal at location 55a, location 55b, location 55c, and location 55d to prevent transport of a fuel and air mixture directly from first fluid flow path 52 to second fluid flow path 54, or dividing wall 46 may allow minor leakage from first fluid flow path 52 to second fluid flow path 54. In the context of this disclosure, minor leakage is leakage insufficient to permit a combustion process occurring in one fluid flow path to travel directly to the other flow path.

Second housing section 44 also provides a first outlet 56 and a second outlet 58. While first outlet 56 and second outlet 58 are shown extending oppositely and collinearly from each other, first outlet 56 and second outlet 58 may extend in a variety of orientations for convenient connection to other elements of engine 10. For example, first outlet 56 and second outlet 58 may extend parallel to either other or first outlet 56 may extend upwardly out of the plane of FIG. 1 and second outlet 58 may extend downwardly out of the plane of FIG. 1.

Heat may be removed from charge air cooling section 36 by air or by liquid. As shown in FIG. 2A, a fluid input line 38 may bring cooling liquid to charge air cooling section 36. A fluid output line 40 may take cooling liquid to a reservoir, radiator or other location (not shown). While a single pair of fluid input and output lines is shown in FIG. 2A, it should be understood that other charge air cooling section 36 configurations are possible. For example, two pairs of cooling lines (not shown) may cool charge air cooling section 36, one of which may contain cooling fluid at a first, higher temperature level and the other of which may contain cooling fluid at a second, lower temperature level. The physical construction of charge air cooling section 36 includes a plurality of relatively small, long passages 42 formed within charge air cooling section 36. Charge air cooler passages 42 work with other elements described in the present disclosure to provide one of the benefits of the present disclosure, described hereinbelow in more detail.

Note that except as noted otherwise herein, each of the connections between various elements in each embodiment described herein is sufficient to prevent leakage of an air-fuel mixture from the various conduits and elements containing the air-fuel mixture.

The first exemplary embodiment functions as follows. Intake air enters air intake 12 and is guided to gas mixer 16 by first conduit 14. Gaseous fuel from gas source 18 is guided to gas mixer 16 by source connection 20. Thus, intake system 11 and fueling system 17 connect at gas mixer 16. An air-fuel mixture travels from gas mixer 16 to compressor 24 of turbocharger 26 via second conduit 22. Compressor Outlet/Inlet Flow Conduit 28 provides a path for the air-fuel mixture from compressor 24 to housing inlet 30 of charge air cooler assembly 32. The air-fuel mixture travels through first housing section 34 to charge air cooling section 36, where the air-fuel mixture travels through a plurality of charge air cooler passages 42. The configuration of charge air cooler passages 42 divides the air-fuel mixture into a plurality of paths. The air-fuel mixture recombines in second housing section 44 on the downstream side of charge air cooling section 36. The configuration of dividing wall 46 causes the recombination of the air-fuel mixture after charge air cooling section 36 to be into two paths. One path is first fluid flow path 52 and another path is second fluid flow path 54. Each fluid flow path is fluidly separate from the other fluid flow path within second housing section 44. Thus, there is no direct fluid flow connection or path between first fluid flow path 52 and second fluid flow path 54.

First fluid flow path 52 is connected to first outlet 56 of second housing section 44. Second fluid flow path 54 is connected to second outlet 58 of housing section 44. The air-fuel mixture that travels from first outlet 56 travels through third conduit 60 to first throttle 62. First throttle 62 may control the quantity of fuel and air permitted to enter a first intake manifold 64, or the amount of fuel may be controlled in other locations, such as gas mixer 16. First bank intake ports 68 transport an air-fuel mixture received via charge air cooler assembly 32 to a plurality of first bank cylinders 70. Second intake manifold 82 includes a plurality of second bank intake ports 84, which guide an air-fuel mixture received via charge air cooler assembly 32 to a plurality of second bank cylinders 86. Exhaust gases exit first bank cylinders 70 at first bank exhaust ports 72 and second bank cylinders 86 at second bank exhaust ports 88, all of which are included in exhaust system 15. First bank exhaust ports 72 and second bank exhaust ports 88 may be part of exhaust manifold 74. Exhaust gases travel through exhaust manifold 74 to exhaust conduit 90, which provides a path for exhaust gases to turbine 92 of turbocharger 26. The flow of exhaust gases through turbine 92 causes turbocharger 26 to rotate, causing the rotation of compressor 24. As previously noted, compressor 24 is part of intake system 11 and fueling system 17 and functions to propel an air-fuel mixture toward charge air cooler assembly 32 and engine body 13. Exhaust gases exit engine 10 at turbine exhaust conduit 94.

Figure 3:
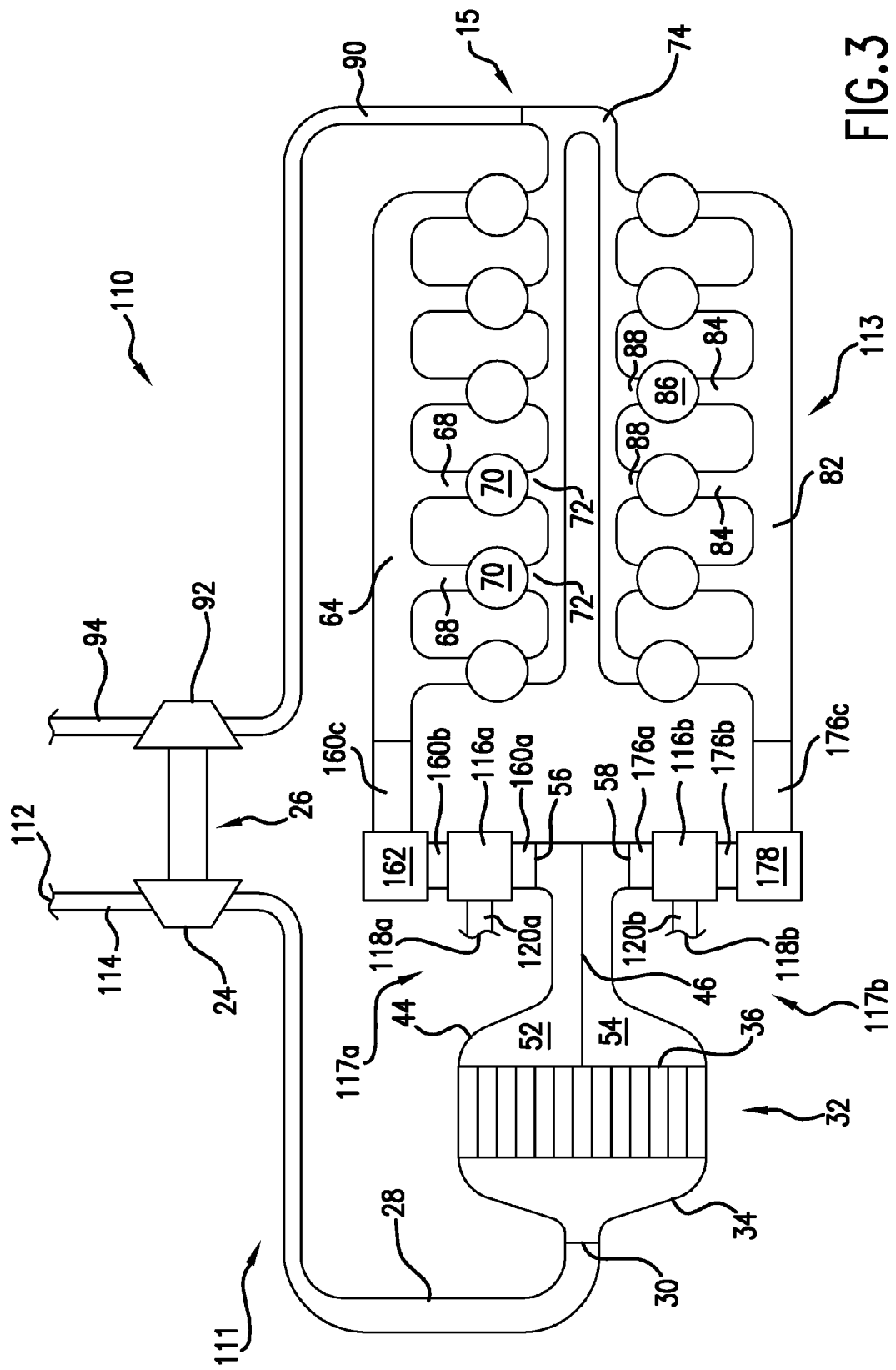
FIG. 3 is a schematic of an internal combustion engine in accordance with a second exemplary embodiment of the present disclosure.

Illustrated in FIG. 3 is a second exemplary embodiment of an internal combustion engine 110 in accordance with the present disclosure, where like numerals refer to like elements. Engine 110 has an air inlet 112 connected via a first conduit 114 to compressor 24 of turbocharger 26. Compressor outlet tube or inlet flow tube 28 connects compressor 24 to housing inlet 30 of charge air cooler assembly 32, which is configured as previously described hereinabove. A conduit 160a may connect first outlet 56 to a first gas mixer 116a. A first source of gaseous fuel or gas source 118a is also connected to first gas mixer 116a by a first source connection 120a. A first source output or conduit 160b may connect first gas mixer 116a to a first throttle 162. Intake manifold 64 may be connected directly to first gas mixer 116a, or a conduit 160c may connect intake manifold 64 to first gas mixer 116a. Similarly, a conduit 176a may connect second outlet 58 to a second gas mixer 116b. A second source of gaseous fuel or gas source 118b is also connected to second gas mixer 116b by a second source connection 120b. A second source output or conduit 176b may then connect second gas mixer 116b to a second throttle 178. A conduit 176c may then connect second throttle 78 to second intake manifold 82. The remaining elements in this embodiment operate similarly to the elements described in the first exemplary embodiment.

In the second exemplary embodiment, air enters charge air cooler assembly 32 via air inlet 112 and first conduit 114 of intake system 111. This inlet air travels through compressor 24 and travels to inlet 30 of charge air cooler assembly 32. Charge air cooler assembly 32 functions as described in the first embodiment, except air is traveling through charge air cooler assembly in place of the air-fuel mixture described in the first embodiment. Air from first outlet 56 may be connected to first gas mixer 116a by conduit 160a. Gas source 118a of fueling system 117a may also be connected to first gas mixer 116a by way of source connection 120a. An air-fuel mixture then travels from gas mixer 116a to first throttle 162, which controls the amount of the air-fuel mixture permitted to enter first intake manifold 64 of engine body 113. Similarly, air from second outlet 58 may be connected to second gas mixer 116b by conduit 160b. Gas source 118b of fueling system 117b may also be connected to second gas mixer 116b by way of source connection 120b. An air-fuel mixture then travels from gas mixer 116b to second throttle 178, which controls the amount of the air-fuel mixture permitted to enter second intake manifold 83 of engine body 113. The other elements in this embodiment, including exhaust system 15, function similar to the element in this first embodiment.

Figure 4:
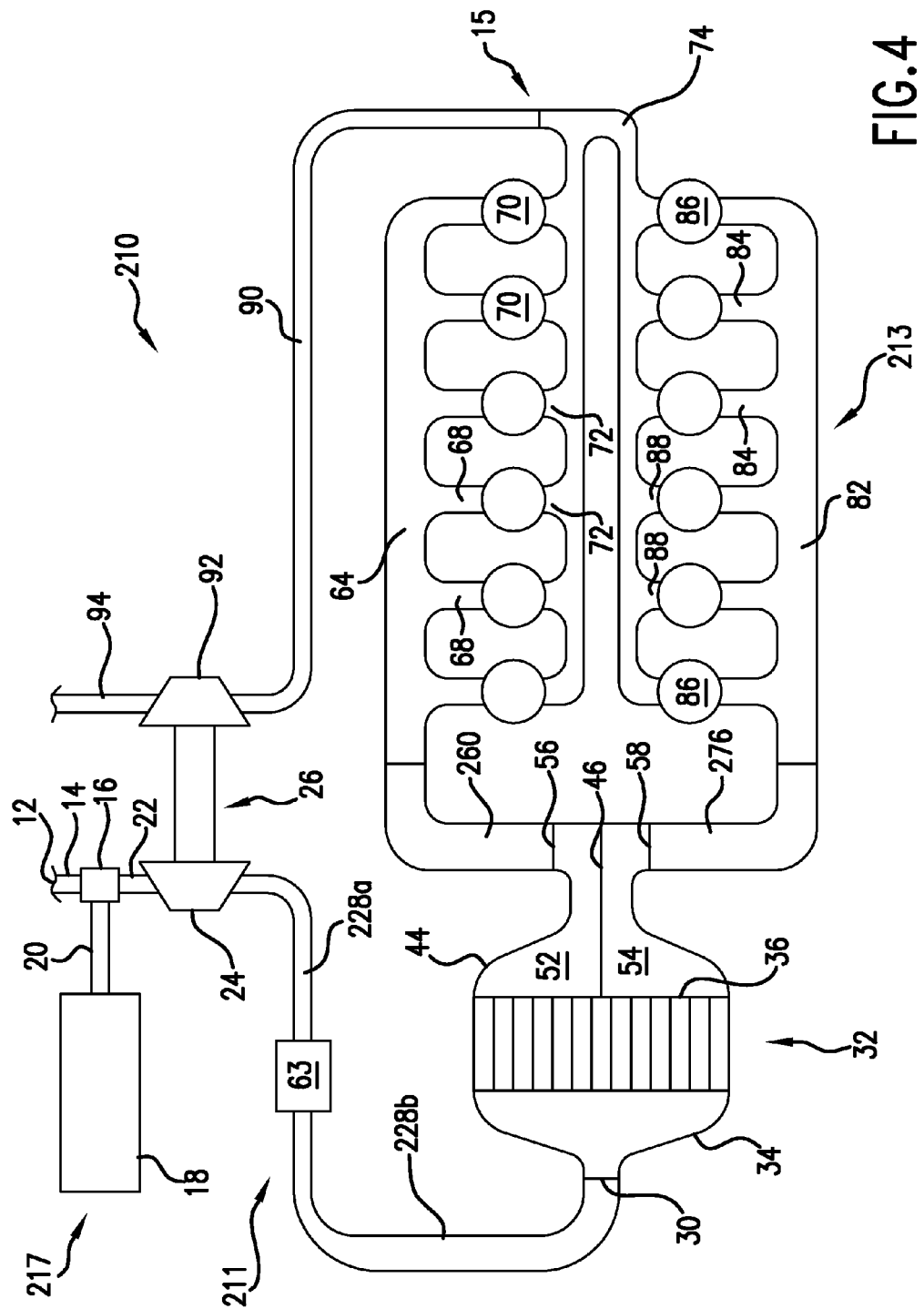
FIG. 4 is a schematic of an internal combustion engine in accordance with a third exemplary embodiment of the present disclosure.

Illustrated in FIG. 4 is a third exemplary embodiment of an internal combustion engine 210 in accordance with the present disclosure, where like numerals refer to like elements. Air from air inlet 12 of intake system 211 is connected via first conduit 14 to gas mixer 16. Natural gas source 18, part of fueling system 217, also connects to gas mixer 16 via a source connection 20. A mixture of fuel and air then travels via second conduit 22 to compressor 24 of turbocharger 26. The mixture of fuel and air then travels via a first inlet flow tube 228a to a throttle 63. A second inlet flow tube 228b connects throttle 63 to housing inlet 30. The configuration of charge air cooler assembly 32 is similar to that previously described. First outlet 56 may be connected to first intake manifold 64 of an engine body 213 by a connecting tube 260. Second outlet 58 may be connected to second intake manifold 82 of engine body 213 by a connecting tube 276. The operation and configuration of first intake manifold 64, second intake manifold 82, first bank intake ports 68, second bank intake ports 84, cylinders 70 and 86, exhaust manifold 74, exhaust conduit 90, turbine 92 and turbine exhaust conduit 94 are as previously described.

When the air-fuel mixture is ignited in an intake manifold due to a leaking valve or for other reasons, the ignition process proceeds rapidly upstream toward the charge air cooler, where ignition in existing charge air coolers crosses over to the opposite intake manifold. The volume of air-fuel ignited is significant and leads to an intake manifold overpressure event that is much greater than typical operating pressures for the components involved. The present disclosure reduces the magnitude of an overpressure event through a relatively simple technique, separating the air-fuel mixture in first intake manifold 64 from the air-fuel mixture in the second intake manifold 82 in the charge air cooler assembly 32.

The benefit to this configuration is as follows. If an ignition event occurs in first intake manifold 64, the ignition travels rapidly toward first outlet 56. In prior art designs, the flame would travel to second outlet 58 and then to second intake manifold 82. In the present disclosure, the presence of dividing wall 46 forces the ignition process to travel through first fluid flow path 52 toward charge air cooling section 36. The size of charge air cooler passages 42 and the relatively low temperature of charge air cooling section 36 causes charge air cooling section 36 to act as a flame suppressor or flame arrestor, decreasing the likelihood that ignition will travel past charge air cooling section 36. In the event ignition does travel past charge air cooling section 36, in order for ignition to travel to second intake manifold 82, ignition would need to travel again through charge air cooler passages 42, further decreasing the likelihood that ignition will reach second intake manifold 82. It is difficult for a flame or ignition to travel upstream from the charge air cooler assembly 32 toward compressor 24 because of the weakness of the flame, the velocity of air traveling toward charge air cooler assembly 32, and elements located between air inlet 12 and charge air cooler assembly 32. Charge air cooling section 36 also weakens a flame, making travel upstream even less likely. Thus, flame travel upstream of charge air cooler assembly 32 is not considered a problem.

Note that while the present disclosure notes use on an internal combustion engine with a "V" configuration, other engine configurations may benefit from the configuration of this disclosure, such as those with a straight or inline configuration. Also, note that additional locations of fuel injection are compatible with the present disclosure and would benefit from the present disclosure. Similarly, other throttle locations are possible, such as adjacent to each intake port. These throttle locations are also compatible with the present disclosure and would benefit from the present disclosure. Also, note that while a single turbocharger is shown, multiple turbochargers may be used, which may also require the addition of an intercooler between turbocharger stages if the turbochargers are in series. Multiple parallel turbochargers may also be used where the output of the multiple parallel turbochargers is combined to feed a single charge air cooler assembly 32.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

I claim:

1. A fueling system for a gaseous fuel powered internal combustion engine, comprising:
   an air inlet;
   a charge air cooler assembly downstream of the air inlet and connected to the air inlet by an inlet flow tube, the charge air cooler assembly including;
   a charge air cooling section;
   a first housing attached to a first side of the charge air cooling section, the first housing including a housing inlet;
   a second housing attached to a second side of the charge air cooling section, the second housing including a first outlet opening and a second outlet opening; and a wall positioned in the second housing and extending from the charge air cooling section to a portion of the second housing between the first outlet opening and the second outlet opening;

wherein the wall creates a first fluid flow path from the charge air cooling section to the first outlet opening, a second fluid flow path from the charge air cooling section to the second outlet opening, the first fluid flow path being fluidly separated from the second fluid flow path by the wall;

a first gas mixer receiving gaseous fuel from a gaseous fuel source, the first gas mixer connected to the first outlet opening downstream of the first outlet opening and having a first source output;

a first intake manifold located downstream of the first source output;

a second gas mixer receiving gaseous fuel from a gaseous fuel source, the second gas mixer connected to the second outlet opening downstream of the second outlet opening and having a second source output; and a second intake manifold located downstream of the second source output.

2. The fueling system of claim 1, wherein the charge air cooler is liquid cooled.

3. The fueling system of claim 1, further including a turbocharger connected to the air inlet downstream of the air inlet and connected to the housing inlet upstream of the housing inlet.

4. The fueling system of claim 1, further including a first throttle connected to the first source output of the first gas mixer downstream of the first gas mixer and connected to the first intake manifold upstream of the first intake manifold.

5. The fueling system of claim 4, further including a second throttle connected to the second source output of the second mixer downstream of the second mixer and connected to the second intake manifold upstream of the second intake manifold.

6. The fueling system of claim 5, wherein the first throttle and the second throttle are positioned collinearly with each other.

7. The fueling system of claim 1, wherein the charge air cooler is liquid cooled.

\* \* \* \* \*